United States Patent [19]

Sutherland et al.

[11] Patent Number: 5,758,139
[45] Date of Patent: May 26, 1998

[54] CONTROL CHAINS FOR CONTROLLING DATA FLOW IN INTERLOCKED DATA PATH CIRCUITS

[75] Inventors: Ivan E. Sutherland, Santa Monica; Charles E. Molnar, Sunnyvale, both of Calif.

[73] Assignee: Sun Microsystems, Inc., Mountain View, Calif.

[21] Appl. No.: 636,260

[22] Filed: Apr. 23, 1996

Related U.S. Application Data

[63] Continuation-in-part of Ser. No. 477,533, Jun. 7, 1995, Pat. No. 5,600,848, which is a continuation of Ser. No. 140,655, Oct. 21, 1993, abandoned.

[51] Int. Cl.$^6$ .................................................. G06F 13/00
[52] U.S. Cl. ................................. 395/559; 395/849
[58] Field of Search .................... 395/200.13, 849, 395/872, 250, 377, 566, 551, 559, 800.011

[56] References Cited

U.S. PATENT DOCUMENTS

| | | | |
|---|---|---|---|
| 4,167,789 | 9/1979 | Faustini | 395/559 |
| 4,837,740 | 6/1989 | Sutherland | 395/310 |
| 5,084,837 | 1/1992 | Matsumoto | 395/250 |
| 5,187,800 | 2/1993 | Sutherland | 395/800.18 |
| 5,386,585 | 1/1995 | Traylor | 395/800 |

*Primary Examiner*—Parshotam S. Lall
*Assistant Examiner*—Viet Vu
*Attorney, Agent, or Firm*—Townsend and Townsend and Crew

[57] ABSTRACT

A technique is disclosed for interlocking FIFO data paths. The data paths are interlocked using a series of control elements which receive input signals not only from the other control elements of their own path, but also from control elements of an adjacent data path. Queues may also be employed between the FIFO control chains to provide greater freedom in the interlocking mechanism.

15 Claims, 3 Drawing Sheets

5,758,139

CONTROL CHAINS FOR CONTROLLING DATA FLOW IN INTERLOCKED DATA PATH CIRCUITS

CROSS REFERENCE TO RELATED APPLICATION

This patent application is a continuation-in-part of U.S. patent application Ser. No. 08/477,533, filed Jun. 7, 1995, now U.S. Pat. No. 5,600,848, which itself is a continuation of U.S. patent application Ser. No. 08/140,655, filed Oct. 21, 1993, now abandoned, entitled "Counterflow Pipeline Processor."

BACKGROUND OF THE INVENTION

This invention relates to first-in first-out (FIFO) digital elements, and in particular to control systems for FIFO's where the control systems have an interlocking arrangement, as well as to methods of interconnecting such control systems.

FIFO processing cells or elements are well known data processing digital elements and can be used for many functions. For example, in the prior work of one of us, as described in U.S. Pat. No. 5,187,800, an asynchronous pipelined data processor is described. That processor employed an asynchronous FIFO data path processing unit operating in response to a series of FIFO control elements.

One problem which arises in the design of systems using FIFO type data paths is the control of the various pipelines with respect to each other. For example, in some digital systems utilizing two or more FIFO data paths, it is essential that information in the two data paths be maintained in a desired relationship with each other. If instructions are processed through the multiple FIFO data paths, it is important that the instructions emerge from the data paths in the same order as entered.

SUMMARY OF THE INVENTION

In the design of certain digital processors or other systems, first-in first-out data paths may be used. In these processors, or other systems, employing multiple FIFO data paths, it is often important to ensure that the operations of the various FIFO data paths are coordinated or interlocked with respect to each other. This invention provides a technique for controlling the multiple data paths to assure that instructions or data in one path remain in a desired relationship with instructions or data in other paths.

In the preferred embodiment, apparatus for controlling a first data path and second data path includes a first control chain and second control chain, each of which includes a series of stages which are serially connected. Each stage in the control chain includes a logic element having at least three input terminals and an output terminal. One of the input terminals is connected to the output terminal of the preceding stage. A second one of the input terminals is connected to the output terminal of the following stage, and the third input terminal is connected through a queue of desired length to the output terminal of a corresponding stage in another of the control chains. These interconnections force each stage to coordinate, not only with its predecessor and successor stages, but also with the corresponding stages in another control chain. In this manner the control chains are coordinated with each other. The queue between the control chains can be of any desired length, including zero length.

DESCRIPTION OF THE SPECIFIC EMBODIMENTS

Figure 2:
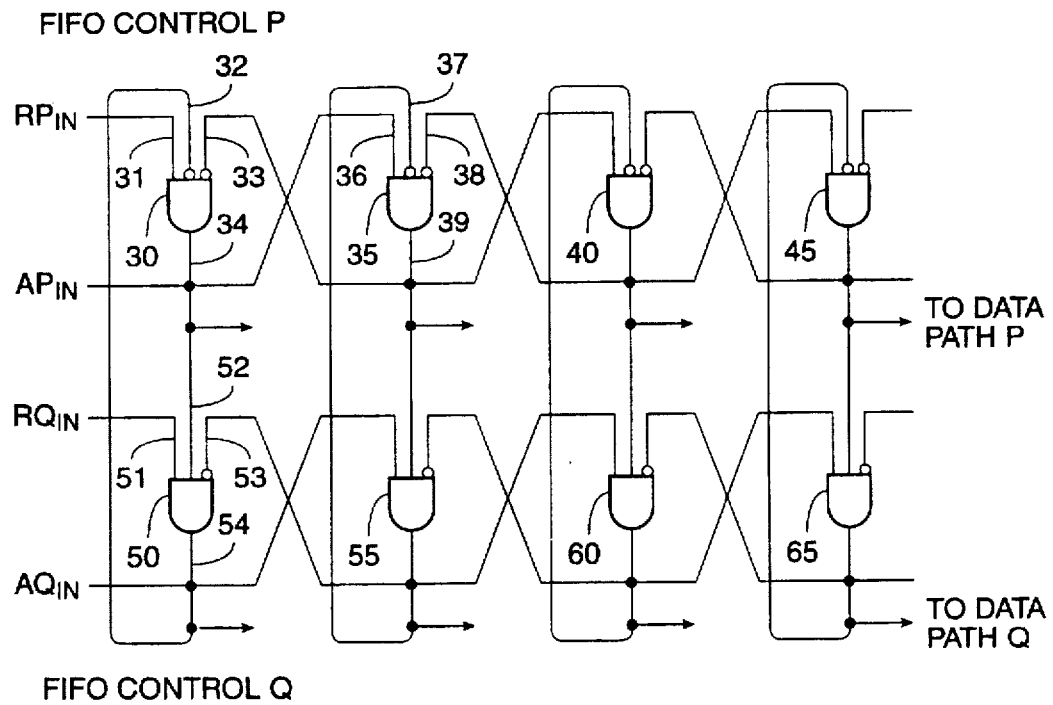
FIG. 2 illustrates a control circuit for two interlocked FIFO pipelines.

This invention considers information flow in a single direction through a series of processing cells formed as two (or more) interconnected FIFO data paths, that is, two FIFO data paths cross-connected to each other. A preferred embodiment for the control circuit for two such digital elements is illustrated in FIG. 2. We refer to such multiple data path FIFOs herein as compound FIFOs. An interlocking mechanism to prevent information in one FIFO data path from going beyond or "passing" specified information in the other interlocked FIFO data path is provided to constrain the information flowing in one or the other or both FIFO data paths. The interlocks limit the relationship between data elements in the two parallel FIFO data paths.

In a system employing two or more counterflow pipelines, for example as described in our paper entitled "Counterflow Pipeline Processor Architecture," by Sproull, R.; Sutherland, I.; and Molnar, C.; Sun Microsystems Laboratories, Inc., Publication SMLI TR-94-25, April 1994, either or both of the counterflowing FIFO PIPELINES can use the compound form described here. In a system with counterflowing compound FIFO PIPELINES, four distinct FIFO data paths could be used. The control system for the two upward-flowing FIFOs uses interlocks, as does the control system for the two downward-flowing FIFOS. The interlocks, as well as associated additional circuitry are described below.

In the pipeline processor referred to above there are at least two uses for the control systems for compound FIFOs. First, they can provide for concurrent arbitration and data advance. Second, in a pipeline processor with multiple instruction pipes, the interlocked control systems help keep the instruction streams in proper order, that is, the instructions in one processor are prevented from passing those in the other processor.

Figure 1:
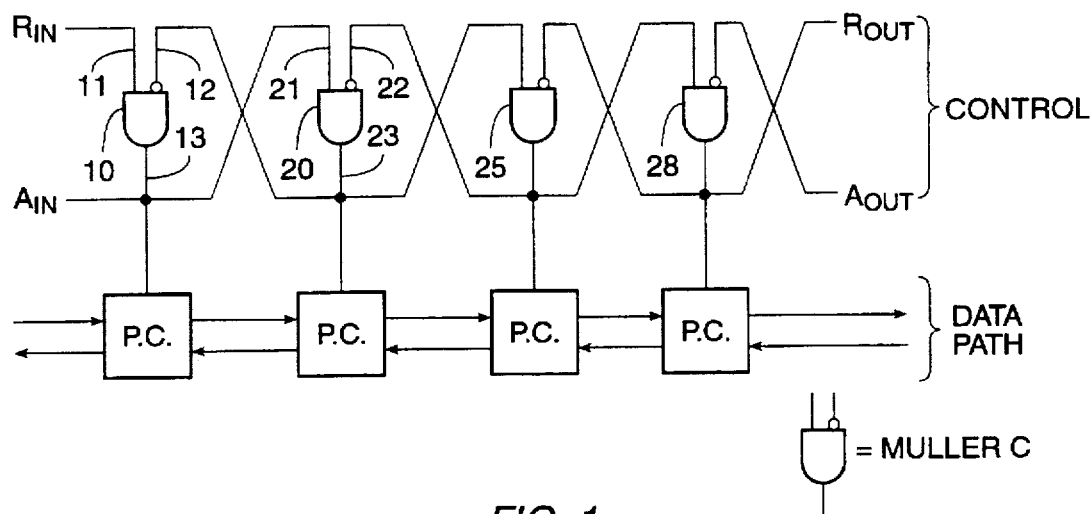
FIG. 1 is a block diagram illustrating a single FIFO pipeline and associated control circuit.

First-in first-out (FIFO) digital pipelines or data paths are well known. FIG. 1 illustrates the FIFO digital data path of a processing unit, and the control circuit for it. Data and instructions are introduced at the input terminals of the processing cells (P.C.) and propagate along the FIFO processor, eventually emerging at the output terminals—in the same order as introduced. At each cell a desired operation with the instructions, or on the data may be performed. The control unit employs a series of interconnected Muller C elements 10, 20, etc., to assure that the processor passes information through the FIFO in sequence and advances only when ready. The Muller C elements activate the processing cells sequentially to process the information through the data path.

FIG. 1 illustrates a single FIFO data path and a single FIFO control path. Such a circuit as depicted can be employed in an event driven system like that described in the "Counterflow Pipeline Processor Architecture" publication mentioned above. As shown in FIG. 1, for illustration the FIFO control includes four Muller C elements 10, 20, 25, and 28 connected together in sequence. Of course, more or fewer control elements can be used depending on the number of P.C. cells, etc. A Muller C element will produce an output event, for example on node 13, after each of its input terminals 11, 12 receives an event. The bubble on one input terminal indicates that initially after master clear, the element behaves as if an event had already been received. Of course, although four Muller C elements are shown, as many as desired can be used. A request input signal R and an acknowledge output signal A appear at the left end of the chain A request event will cause information to propagate down the chain of processing cells and emerge at the right end. The acknowledge signal from each successive Muller C element enables the previous Muller C element to receive the next request input signal and propagate that request through the chain.

FIG. 2 is a schematic diagram illustrating two interlocked FIFO control chains. Each Muller C element in FIG. 2 is connected to a corresponding processing cell, not shown, in one of two FIFOs designated by the arrow labeled "To Data Path." Extending horizontally across the upper portion of FIG. 2 is a first FIFO control chain, with a second FIFO control chain extending horizontally across the lower portion. The connections between them in FIG. 2 enable each FIFO control chain to influence the other. The upper chain, FIFO control P, has a request input terminal $RP_{IN}$ and an acknowledge terminal $AP_{IN}$, while the lower control chain FIFO control Q has a request input terminal $RQ_{IN}$ and an acknowledge terminal $AQ_{IN}$. FIFO control P includes Muller C elements 30, 35, 40, and 45, while FIFO control Q includes Muller C elements 50, 55, 60, and 65. FIFO control chain P includes a connection from the output terminal 39 of element 35 back to an input terminal 33 of element 30 to enable element 30 only after information has been propagated further down the chain. Similarly, a "zig-zag" connection extends among all the elements of FIFO control P and another "zig-zag" connection extends among the elements of FIFO control Q.

The interlocked FIFO control circuit of FIG. 2 also includes additional connections to link the two FIFO control chains P and Q together. These additional connections are shown as extending between the two FIFO control chains. For example, the output node 34 of element 30 is coupled to an input terminal 52 of element 50. Similarly, the output node 54 of element 50 is coupled to input terminal 32 of element 30. With this interconnection, the upper FIFO control can advance data along its corresponding controlled component (not shown) only in coordination with the lower FIFO, and vice versa. With the connections shown, signals from the upper control are required before the lower control may act. Signals from the lower FIFO control are required before the upper control can trigger again.

For example, the request presented at input terminal 31 will be passed to output terminal 34 when enabled by signals on input terminals 32 and 33. The output signal 34, in addition to being coupled to element 35, is also coupled to input terminal 52 of element 50 in the lower FIFO control chain. Thus, element 50 in the lower FIFO control chain can operate only after receiving its enabling signal on input terminal 51, the output signal from element 30 on input terminal 52, and the acknowledge signal from downstream elements on input terminal 53. Once all of those conditions occur, the output signal is placed on line 54. That output signal in turn enables element 30 to receive its next input signal. In this manner the behavior of the two FIFO controls is coordinated.

In FIG. 2 the cross connections between the two FIFO controls impose several constraints on the operation of the two FIFO control circuits. The connections between the control chains prevent the lower FIFO control from supplying output signals which overtake the upper FIFO control. Thus, if the data element N has arrived in some stage of the FIFO data path controlled by the upper chain, at most data element N has arrived at the same stage of the FIFO data path controlled by the lower FIFO control. The other connection between the FIFO controls puts a similar, but slightly different, constraint on the upper FIFO control. If data element N has arrived at the lower FIFO control, then at most data element N+1 has arrived at the upper FIFO control. The circuit depicted is advantageous because it prevents instructions in either one of the paths controlled by the FIFO control circuits from overtaking instructions in the other path. Thus, if instructions are inserted into the two paths alternately, they will emerge alternately, and none can overtake its predecessor. Importantly, however, instructions in either path may catch up with the immediately preceding instruction in the other path. Thus, a "stall" in one of the controlled data paths is not an irretrievably lost cycle. The stall can "catch up" to the other data path, if the conditions allow.

Figure 3:
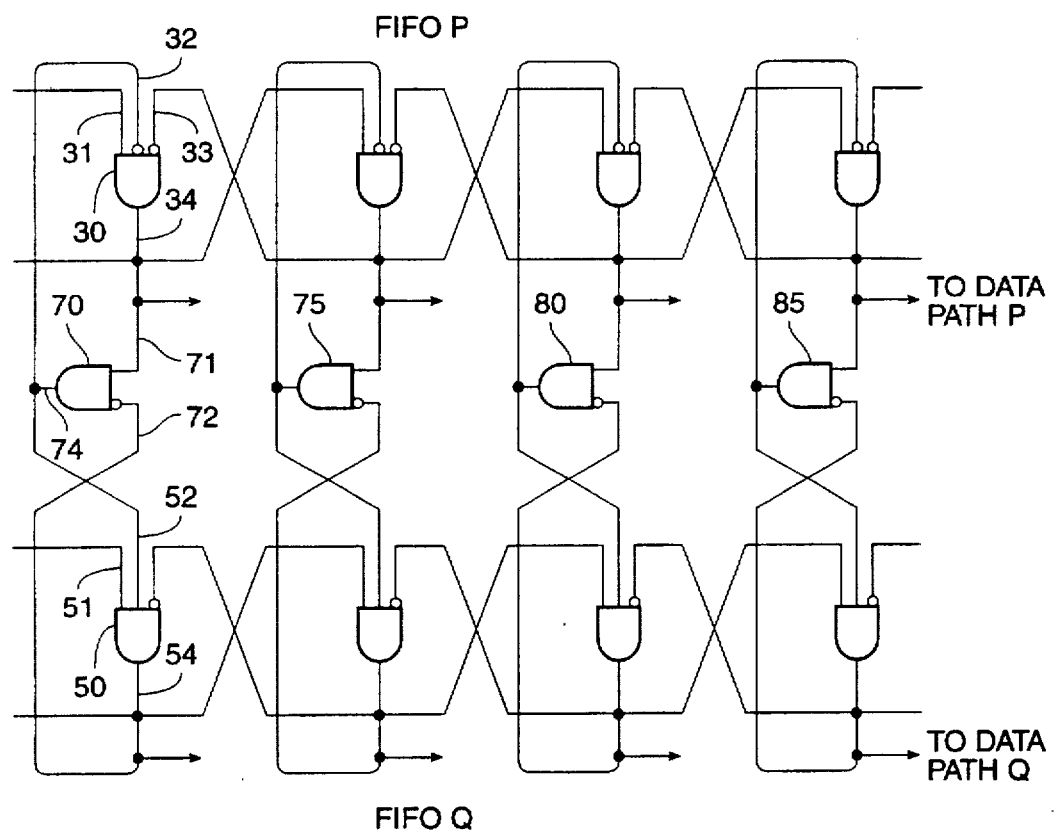
FIG. 3 illustrates a control circuit for two interlocked FIFO pipelines with a single stage queue between the two pipelines.

FIG. 3 illustrates the same two interlocked FIFO control chains, but with additional Muller C elements provided to permit more leeway in the sequence of signals passing along the two control chains. Instead of having the two FIFO control circuits directly connected as shown in FIG. 2, another Muller C element is added to the circuitry between each control chain, as shown in FIG. 3. For example, Muller C element 70 is connected between the terminals of element 30 and the terminals of element 50. As shown, input terminal 71 of added element 70 is coupled to receive the output signal 34 from element 30, while input terminal 72 of element 70 receives the output signal 54 from element 50. The output of element 74 is coupled to both input terminal 52 of element 70 and input terminal 32 of element 30. The advantage of the circuitry shown in FIG. 3 is that it permits greater leeway in the timing of the control signals passing along the two FIFOs. In the case of FIG. 3, the upper FIFO control allows its controlled data path to pass the controlled data path of the lower FIFO control by at most one element, and vice versa.

Figure 4:
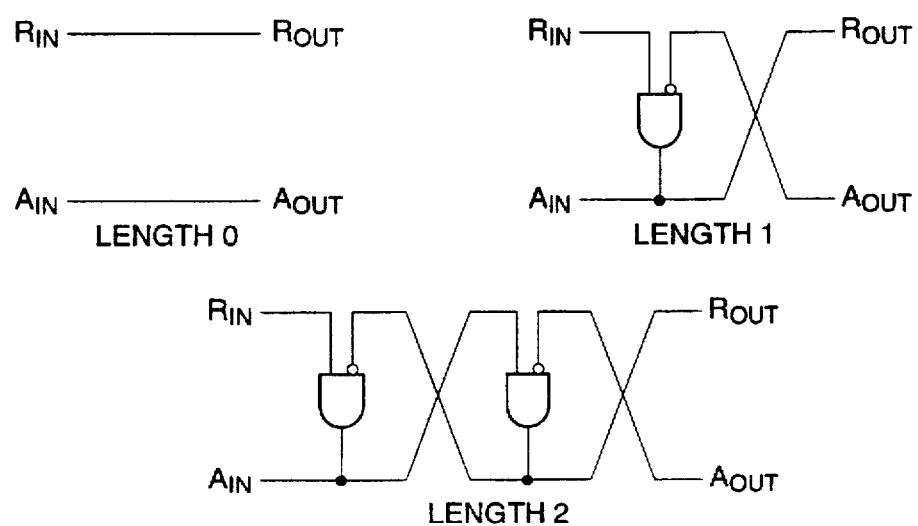
FIG. 4 illustrates the circuitry necessary to provide queues of different lengths.

Comparing FIG. 2 with FIG. 3 illustrates that a queue of any length may be placed between the two FIFOs. In FIG. 2 the queue is zero length, that is, a direct connection. In FIG. 3 the connection scheme provides a queue of length one. FIG. 4 illustrates the queues of length zero, length one, and the queue of length two. In the queue of length two, two Muller C elements are used in place of the zero elements of FIG. 2 or the single element of FIG. 3.

The introduction of a queue as shown in FIG. 4 between the FIFO controls permits a looser coupling between the FIFO control chains. The queue allows the upper FIFO control to proceed at its own pace, but each action that it takes places an event into the queue. If the queue is full, then the upper FIFO control cannot act. Similarly, the lower FIFO control can proceed at its own pace, but only when it gets an event from the queue. Moreover, each cycle of the lower FIFO control will remove an element from the queue, and when the queue is empty, the lower FIFO control cannot proceed further.

In FIG. 3, if the upper FIFO control chain stalls for some reason, then the lower FIFO control can at most catch up with it, at which point the queue will be empty. If the lower FIFO control stalls, then the upper FIFO can proceed at most by one more step than the capacity of the queue, after which the queue will be full, preventing further action of the lower FIFO control. Thus, if an element N has reached the upper FIFO, at most element N will have reached the lower FIFO. Similarly, if element N has reached the lower FIFO, at most element N+Q+1 will have reached the upper FIFO, where Q is the capacity of the queue.

Figure 5:
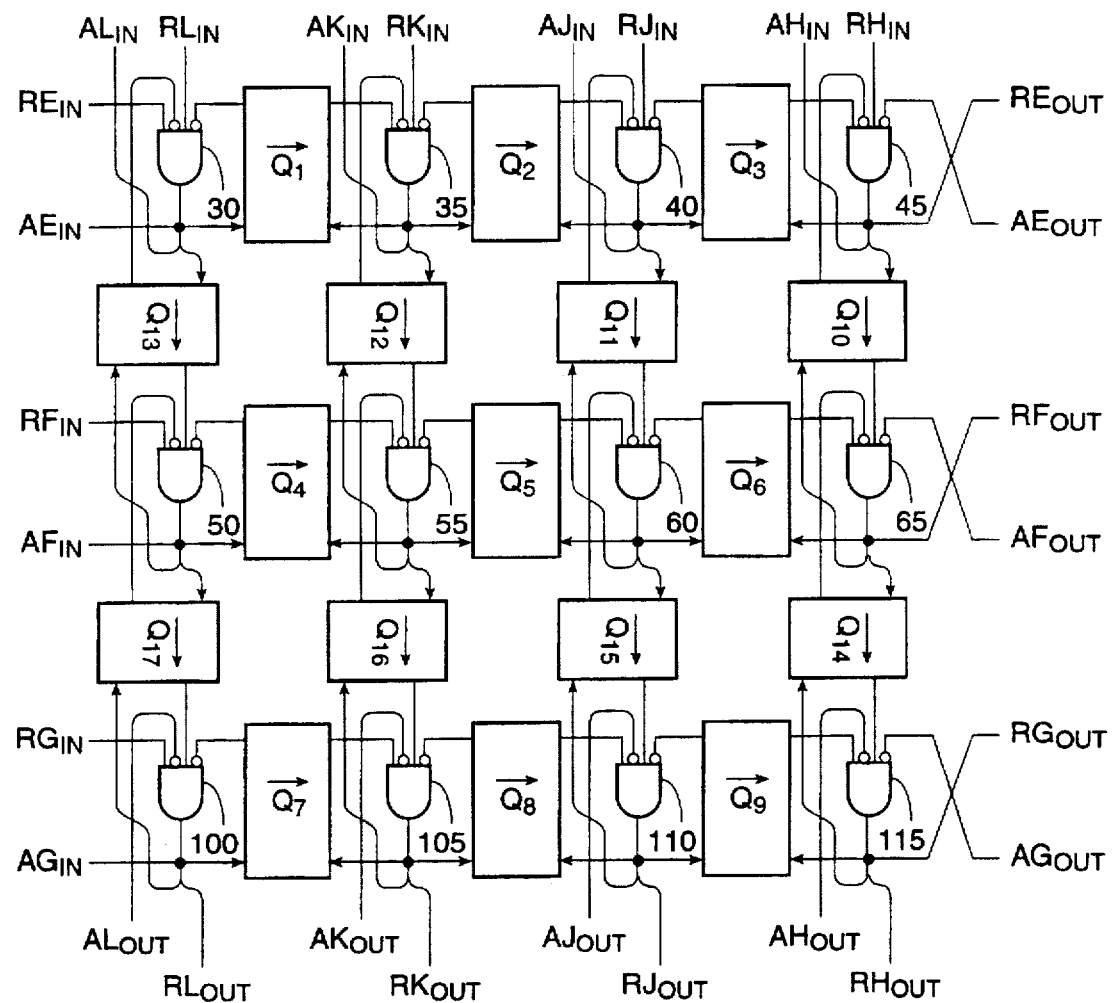
FIG. 5 is a diagram illustrating a control circuit for multiple FIFO pipelines in two dimensions.

FIG. 5 illustrates a two-dimensional FIFO control scheme. The FIFO control shown in FIG. 5 illustrates three horizontal FIFO control chains of four stages each, and four vertical FIFO control chains of three stages each. The first horizontal control chain E includes elements 30, 35, 40, and 45, as well as intervening queues, $Q_1$, $Q_2$, and $Q_3$. Similarly, the FIFO control chain F is formed by elements 50, 55, 60, and 65, while the elements for the control chain G are provided by elements 100, 105, 110, and 115. Not shown in FIG. 5 is the two-dimensional array of FIFO data paths controlled by the circuit. Of course, any number of horizontal FIFO control chains may be used, and each chain may be of any desired length. The queues labeled $Q_1, Q_2, Q_3, \ldots Q_9$, appear between the stages illustrated, with each queue being of any desired length (including zero). Each queue can employ the techniques shown in FIG. 4. The horizontal FIFOs, E, F, and G, are connected vertically by four paths designated H, J, K, and L. These paths use the elements already described, and in addition, employ queues $Q_{10}$, $Q_{11}$, $Q_{12}, \ldots Q_{17}$. As with the horizontal queues, each vertical queue can be formed using the desired technique to make it any length. One can consider the arrangement of FIG. 2 to result from using zero length queues in both the horizontal and vertical paths, with the arrangement of FIG. 3 using queues of length zero in the horizontal and length one in the vertical paths.

The arrays shown in FIG. 5 will pass control signals both horizontally and vertically. A signal at any point in the array cannot precede the signal to its right or below it by more than the length of the queues in those directions. Any data path controlled by these signals will flow from left to right on paths E, F, or G, or flow from top to bottom on paths H, J, K, and L.

Figure 6:
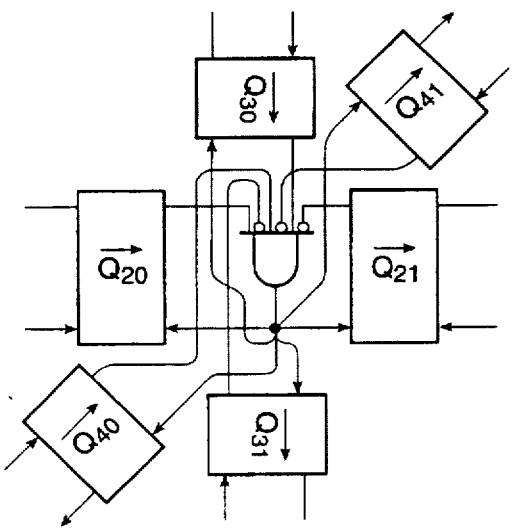
FIG. 6 is a diagram illustrating the control circuit for a three-dimensional array of FIFO data paths.

FIG. 6 further generalizes the concept of queues described in conjunction with FIGS. 1 to 5. FIG. 6 illustrates one portion of a three-dimensional array of FIFO controls having properties similar to those shown in FIG. 5. In effect, FIG. 6 links together FIFO data paths flowing in any number of orthogonal directions. To visualize such a structure, consider multiples of the circuit shown in FIG. 5, but stacked one atop the other, as well as beside, and in front of, the circuit shown. As shown in FIG. 6, a FIFO control circuit is provided for FIFOs extending in three directions. Queues $Q_{20}$ and $Q_{21}$ operate in a horizontal dimension, queues $Q_{30}$ and $Q_{31}$ operate in the vertical direction, and queues $Q_{40}$ and $Q_{41}$, operate in the third dimension (e.g., above and below the plane of the horizontal and vertical queues), as illustrated diagonally in the figure. As before, each queue may be of any desired length.

Although the foregoing invention has been described in some detail by way of illustration and example, for purposes of clarity of understanding, it will be obvious that certain changes and modifications may be practiced within the scope of the appended claims.

What is claimed is:

1. Apparatus for controlling a first data path and a second data path comprising:

a first control chain coupled to the first data path for controlling data flow in the first data path and a second control chain coupled to the second data path for controlling data flow in the second data path, each control chain including a series of serially connected control elements, each control element including at least three input terminals and an output terminal wherein the output terminal controls the flow of data through a corresponding logic element in the data path corresponding to the control chain of the control element; and a first one of the three input terminals being connected to the output terminal of a preceding stage, a second one of the three input terminals being connected to the output terminal of a following stage, and a third input terminal wherein the third input terminal of a control element in the first control chain is connected through a queue to the output terminal of a corresponding stage in the first and second control chain and the third input terminal of a control element in the second control chain is connected through a gueue to the output terminal of a corresponding stage in the first control chain.

2. Apparatus as in claim 1 wherein the queue has a length zero.

3. Apparatus as in claim 2 wherein the queue comprises a wired connection directly connecting the third input terminal to the output terminal of the corresponding stage in the other of the first and second control chain.

4. Apparatus as in claim 1 wherein the queue has a length one.

5. Apparatus as in claim 4 wherein the queue comprises an additional logic element having a first input node connected to the output terminal of the logic element in the first control chain, a second input node connected to the output terminal of the logic element in the other control chain, and an output node connected to the third terminal of the logic element in the second control chain.

6. Apparatus as in claim 1 wherein the queue has a length two.

7. Apparatus as in claim 6 wherein the queue comprises two additional control elements serially connected between corresponding control elements in the first and second control chains.

8. Apparatus as in claim 1 wherein the queue has a length n and comprises n additional control elements serially connected between corresponding control elements in the first and second control chains.

9. Apparatus as in claim 1 wherein the control elements each comprise Muller C elements.

10. Apparatus for controlling a group of at least three data paths having at least one logic element shared among each of at least three control chains, the apparatus comprising:

a first control chain coupled to a first data path, the first control chain including a series of alternating first logic elements and first queues;

a second control chain coupled to a second data path, the second control chain including a series of alternating second logic elements and second queues;

a third control chain coupled to a third data path, the third control chain including a series of alternating third logic elements and third queues; and at least one of the first, second, and third logic elements being provided by a single logic element connected to each of the at least three control chains, the single logic element having a plurality of input terminals, separate ones of the plurality of input terminals being connected to an immediately preceding queue and an immediately following queue in each of the at least three control chains, the single logic element having an output terminal commonly connected to all of the queues connected to any of the input terminals of the logic element.

11. Apparatus as in claim 10 wherein each of the first, second, third logic elements comprise Muller C elements.

12. Apparatus as in claim 10 wherein the at least three data paths extend in different directions.

13. Apparatus for controlling an array of data paths, a first set of the data paths extending in a first direction and a second set of the data paths extending in a second direction:

a plurality of control elements each having a first ordinal position and a second ordinal position;

a first ordered set of control chains, each control chain coupled to a data path in the first set of data paths and comprising control elements with corresponding second ordinal positions alternating with queues from a first set of queues;

a second ordered set of control chains, each control chain coupled to a data path in the second set of data paths and comprising control elements with corresponding first ordinal positions alternating with queues from a second set of queues; and each of the control elements being a control element of a first control chain from the first ordered set of control chains and a second control chain from the second ordered set of control chains and the control element having:

a first input terminal coupled to a queue separating the control element from its preceding control element in its first control chain when the control element is not the first control element in its first control chain;

a second input terminal coupled to a queue separating the control element from its following control element in its first control chain when the control element is not the last control element in its first control chain;

a third input terminal coupled to a queue separating the control element from its preceding control element in its second control chain when the control element is not the first control element in its second control chain; and a fourth input terminal coupled to a queue separating the control element from its following control element in its second control chain when the control element is not the last control element in its second control chain.

14. Apparatus as in claim 13 wherein the array includes a third set of data paths extending in a third direction, the apparatus further comprising:

a third set of control chains coupled to the data paths in the third set, each one of the third set of control chains including control elements alternating with queues, the third set of control chains being connected to at least one of the first and second set of control chains.

15. Apparatus as in claim 13 wherein each of the control elements comprise Muller C elements.

* * * * *